(12) United States Patent
Henderson

(10) Patent No.: US 7,895,227 B1
(45) Date of Patent: Feb. 22, 2011

(54) SYSTEM AND METHOD FOR DETECTING TRENDS IN NETWORK-BASED CONTENT

(75) Inventor: Kenneth Henderson, Folsom, CA (US)

(73) Assignee: Intuit Inc., Mountain View, CA (US)

( * ) Notice: Subject to any disclaimer, the term of this patent is extended or adjusted under 35 U.S.C. 154(b) by 218 days.

(21) Appl. No.: 11/741,610

(22) Filed: Apr. 27, 2007

(51) Int. Cl.
*G07F 19/00* (2006.01)

(52) U.S. Cl. ............... 707/769; 707/999.002; 707/999.003; 707/E17.018; 705/26; 709/224

(58) Field of Classification Search ........ None
See application file for complete search history.

(56) References Cited

U.S. PATENT DOCUMENTS

| | | | |
|---|---|---|---|
| 5,922,051 A | | 7/1999 | Sidey et al. |
| 6,119,933 A | * | 9/2000 | Wong et al. ............ 235/380 |
| 6,463,455 B1 | | 10/2002 | Turner et al. |
| 7,523,016 B1 | * | 4/2009 | Surdulescu et al. ...... 702/185 |
| 2005/0102259 A1 | * | 5/2005 | Kapur ..................... 707/1 |
| 2006/0293912 A1 | | 12/2006 | van der Linde et al. |
| 2007/0275690 A1 | * | 11/2007 | Hunter et al. ........ 455/404.2 |
| 2008/0097891 A1 | * | 4/2008 | Park .......................... 705/37 |

OTHER PUBLICATIONS

Google Alerts (BETA): Frequently asked Questions:, Google, 2004, 2 pages.
"Google Trends-About Google Trends", Google, 2006, 3 pages.

* cited by examiner

*Primary Examiner*—Don Wong
*Assistant Examiner*—Shyue Jiunn Hwa
(74) *Attorney, Agent, or Firm*—Gunnison, McKay & Hodgson, L.L.P.; Philip McKay

(57) ABSTRACT

Various embodiments of a system and method for detecting trends in network-based content, such as trends within the content of various network locations, are described. The system and method for detecting trends in network-based content may include a network-based trend service that enables a user to create a trend profile. The trend profile may include, a search target, a sampling frequency or schedule, and/or one or more thresholds. To determine the level of network-based activity for a search target, the network-based trend service may determine which network locations of a search domain contain the search target. The network-based trend service may determine the number of instances of the search target found within each search result. The network-based trend service may capture data samples that may include the total number of search results and/or the total instance count and may determine one or more trends from the data samples.

28 Claims, 7 Drawing Sheets

SYSTEM AND METHOD FOR DETECTING TRENDS IN NETWORK-BASED CONTENT

BACKGROUND

The Internet and World Wide Web provide users with various types of web content such as web pages and other web documents. For instance, the Internet may enable users to access a multitude of information including, among other things, local news reports (e.g., local, national, and world news), weather reports, sports scores, encyclopedia entries, online dictionaries, and other sources of information. Due to the large amount of information available, various tools, such as search engines, have been developed to help users find web content pertaining to a particular topic. Search engines may enable users to search web content by keyword. For example, in response to receiving a keyword from a user, a search engine may return a list of web pages that include the keyword. In other words, search engines may enable a user to quickly locate and retrieve particular web content associated with specific search topics of interest.

In some cases, web content, such as web pages and other web documents, may collectively provide insight into web activity associated with particular topics. For example, a large number of web pages with references to a particular search topic (e.g., a new book or movie) may indicate a high level of web activity for the search topic. Similarly, a small number of web pages with references to a particular search topic may indicate a low level of web activity for the search topic. However, search engines and other tools for finding information on the Internet and World Wide Web typically do not provide users with indications of trends of web content levels for particular search topics.

SUMMARY

Various embodiments of a system and method for detecting trends in network-based content, such as trends of web content from the Internet and World Wide Web, are described. The system and method for detecting trends may include a network-based trend service that may enable a user to create a trend profile, such as through an online account service interface or other user interface. A trend profile may include, among other things, a search target (e.g., a term or phrase). The network-based trend service may, at regular intervals, determine the level of network-based activity for the search target. In other words, the network-based trend service may determine how much network-based content relates to the search target. To determine the level of network-based activity for a search target, the network-based trend service may determine which network locations (e.g., network content, web pages, and other network-based content) of a search domain contain the search target. A search domain may include all or a portion of a particular network (e.g., the Internet), such as all network-based content accessible to the network-based trend service or a specific set of network-based content (e.g., specific set of web pages). The search domain may be specified by the user in the trend profile. The network-based trend service may determine the number of instances of the search target within each network location that includes network-based content with at least one instance of the search target.

The network-based trend service may capture one or more data samples that include, among other things, the total number of network locations that include the search target and/or the total number of instances of the search target. As data samples are captured over time, they may be aggregated into trend data that may reflect one or more trends about the level of network-based activity of the search target. For example, varying levels of interest among the Internet for a particular search target may result in varying numbers of web pages that contain the search target. Accordingly, capturing data samples over a period of time may reveal one or more trends about the level of web activity for a particular search target. In various embodiments, the network-based trend service may determine one or more trends among the trend data and create corresponding trend reports that may detail the particular trends or characteristics of the trend data.

Figure 1:
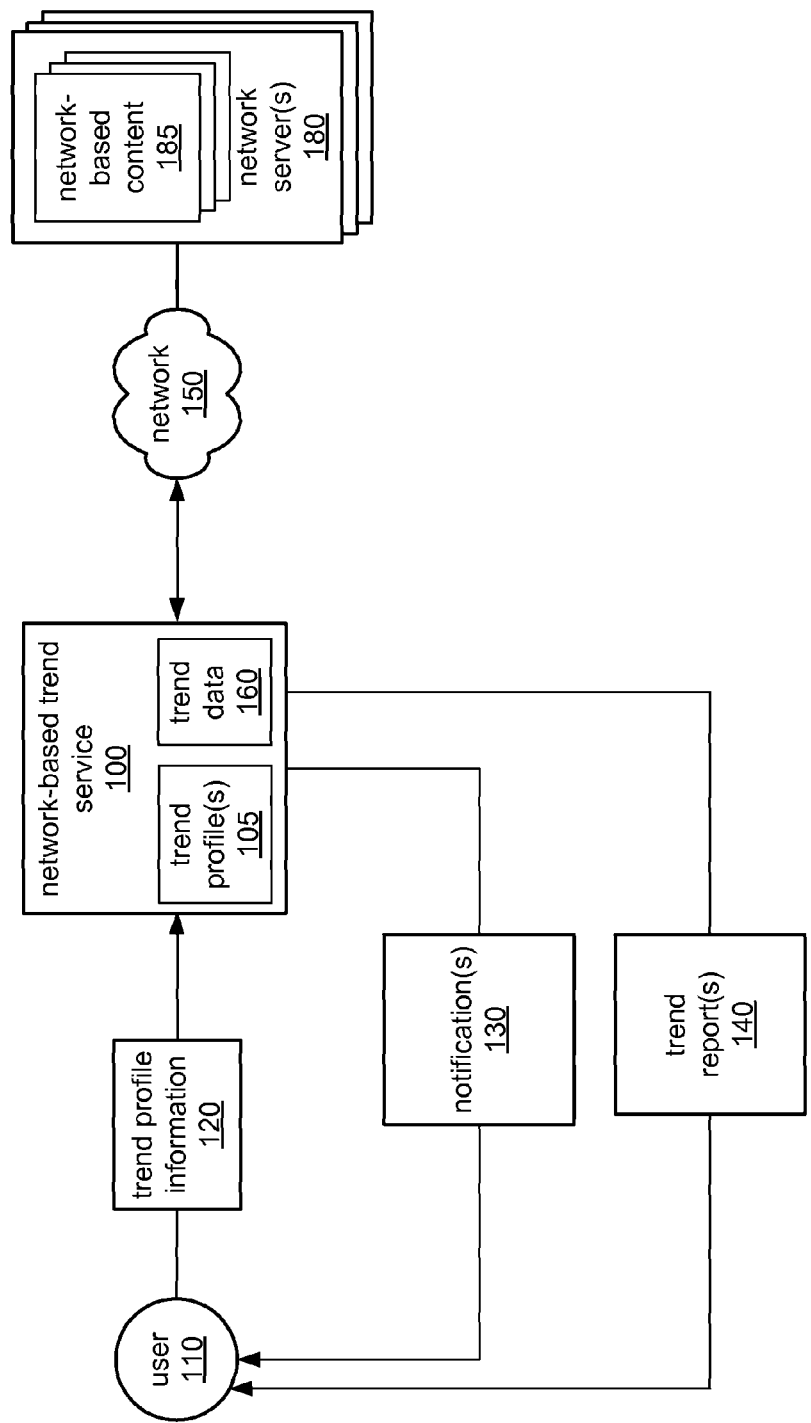
FIG. 1 is a data flow diagram illustrating one embodiment of a system for detecting network-based trends, as described herein.

While the system and method for detecting trends in network-based content is described herein by way of example for several embodiments and illustrative drawings, those skilled in the art will recognize that the system and method for detecting trends in network-based content is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for detecting trends in network-based content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for detecting trends in network-based content, such as trends of web content from the Internet and World Wide Web, are described. The system and method for detecting trends in network-based content may include a network-based trend service that may enable a user to create a trend profile, such as through an online account service or other interface. A trend profile may include, among other things, a search target (e.g., a term or phrase). The network-based trend service may, at regular intervals, determine the level of network-based activity for the search target on a network, such as a Local Area Network (LAN), a Wide Area Network (WAN), the Internet or combinations thereof. In other words, the network-based trend service may determine how much network-based content relates to the search target. To determine the level of network-based activity for a search target, the network-based trend service may determine which network locations of a search domain contain network content that includes the search target. A search domain may include all or a portion of a network, such as all network content accessible to the network-based trend service or a specific set of network locations. The search domain may be specified by the user in the trend profile. An indication of the network-based content (e.g., the network location) that includes at least one instance of the search target as determined by the network-based trend service may be referred to herein as a search result. The network-based trend service may also determine the number of instances of the search target within each search result (e.g., an instance count).

The network-based trend service may capture one or more data samples that include, among other things, the total number of search results and/or the total instance count (e.g., sum of each instance count). As data samples are captured over time, they may be aggregated into trend data that may reflect one or more trends about the level of network-based activity of the search target on the network. For example, varying levels of interest among the Internet for a particular search target may result in varying amounts of web pages that contain the search target. Accordingly, capturing data samples over a period of time may reveal one or more trends about the level of web activity for a particular search target. In various embodiments, the network-based trend service may determine one or more trends among the trend data and create corresponding trend reports that may detail the particular trends or characteristics of the trend data.

As used herein, the phrase "network-based content" may refer to any document and/or resource available through a network. In various embodiments, network-based content may refer to the various documents and resources of the Internet and World Wide Web that may be interconnected via hyperlinks and/or URLs, such as documents or resources adhering to web standards and formats including, but not limited to, HyperText Markup Language (HTML), eXtensible HyperText Markup Language (XHTML), Cascading Style Sheets (CSS), eXtensible Markup Language (XML) and other technologies including JavaScript, PHP: Hypertext Preprocessor (PHP), Active Server Pages (ASP), and/or Structured Query Language (SQL). The network-based trend service may be operable on various networks, such as LANs (e.g., corporate or Ethernet networks), WANs, the Internet, or combinations thereof.

A network-based trend service according to one embodiment is illustrated in the data flow diagram of FIG. 1. A network-based trend service, such as network-based trend service 100, may include one or more trend profiles that include configuration information for detecting trends among network-based content, such as network-based content 185 hosted by network servers 180, accessible through a network, illustrated as network 150. Network server 180 may be any of various computer systems coupled to a network (e.g., the Internet, a LAN or WAN) including, but not limited to, a web server, an application server, a database server, or a combination thereof. Network 150 may be any of various networks including, but not limited to, LANs, WANs, the Internet, or a combination thereof. In various embodiments, network-based trend service 100 may enable a user to create one or more trend profiles, such as trend profile(s) 105, for a particular search target by submitting trend profile information, such as trend profile information 120. Trend profile information 120 may include, but is not limited to, a search target, a sampling frequency or schedule, and/or one or more thresholds.

In general, a search target may include any term or phrase for which a network (e.g., the Internet) may be searched. Additionally, a search target may include combinations of terms and phrases (e.g., "this AND that", "this OR that", "this NOT that"), such as those commonly used to perform Boolean searches. In most cases, the search target may be an item for which trend information is desired. For example, a user may submit the name of a product as the search target to determine the network-based activity associated with the particular product over time. Another example of a search target may include a celebrity name to determine the level of network-based activity associated with the celebrity on a particular network over time. For instance, the level of network-based activity associated with a particular celebrity might increase significantly after a movie in which the celebrity is cast is released. In another example, a search target may be associated with a safety recall for a particular product (e.g., the vehicle name and/or terms associated with the recall) to determine the level of network-based activity associated with the recall.

Trend profile information 120 may include a sampling frequency and/or a sampling schedule that indicates when data samples should be captured by network-based trend service 100. Trend profile information 120 may include a variety of sampling frequencies such as "once per day", "twice per day", "once per week" or any other frequency. In some cases, the trend profile information may include a sampling schedule that indicates specific dates and/or times at which the samples should be captured. Trend profile information 120 may also include one or more thresholds that network-based trend service 100 may utilize. In some embodiments, the thresholds may be used to specify when network-based trend service 100 should provide a notification to a user. For example, a threshold may specify that network-based trend service 100 should notify user 110 when 1,000 search results have been detected for a particular search target. In another example, a threshold may be used to specify when network-based trend service 100 should begin recording data samples. For example, a threshold may specify that network-based trend service 100 should begin recording samples once 50 search results have been detected. In various embodiments, thresholds may specify maximums or minimums. For example, a threshold may indicate that network-based trend service 100 should begin recording samples once 500 search results have been detected (a minimum threshold) or, alternatively, when less than 1,000 search results have been detected (a maximum threshold). In some cases, multiple minimum and maximum thresholds may be used by network-based trend service 100 simultaneously. For example, a threshold may indicate that network-based trend service 100 should begin recording data samples once less than 1,000 but more than 500 search results have been detected. In general, network-based trend service 100 may utilize any combination of individual thresholds.

Additionally, thresholds may include conditions other than search results. For example, a threshold may indicate a particular instance count or an average instance count per search result (e.g., 2 instances per search result). In various embodiments, the trend profile information may include one or more thresholds that include a percentage change in number of search results. For instance, a user may specify in trend profile information 120 that the network-based trend service should begin capturing data samples after a 25% percent increase in number of search results has been detected. For example, a data sample indicating 1,250 search results may trigger a 25% increase threshold if the previous sample indicated 1,000 or less search results. Similarly, a threshold may include a percentage decrease. In various embodiments, a threshold that indicates a percentage change in search results may also indicate a time interval for the change (e.g., "25% increase over 1 week or less).

Network-based trend service 100 may store trend profile information 120 in a respective trend profile, such as trend profile 105, associated with the specific search target of trend profile information 120. In other words, user 110 may create or "launch" a trend profile 105 by providing trend profile information 120 to network-based trend service 100. After a trend profile is launched, network-based trend service 100 may begin analyzing network 150 for the respective search target. For each trend profile 105, analyzing network 150 may include navigating through various network locations accessible through network 150 and determining if the network locations contain the search target of the trend profile. In various embodiments, network-based trend service 100 may "crawl" network 150 to determine if various network locations contain the search target. In some embodiments, network-based trend service 100 may store, cache, and/or index network locations of network 150 in order to facilitate processing of each network location. A search result may include a network location that contains at least one instance of the respective search target. In various embodiments, the network-based trend service may determine the instance count (e.g., a count of the instances of the search target within a particular network location) of each search result.

According to the sampling frequency (and/or sampling schedule) of the trend profile, network-based trend service 100 may capture data samples that include, among other things, the number of search results for the search target of a respective trend profile, an instance count for each search result, as well as the network location identifiers (e.g., URLs, pathnames and other identifiers) corresponding to each search result. For example, network-based trend service 100 may capture data samples once per hour, per day, per month or according to another frequency. In some cases, user 101 may provide network-based trend service with a specific sampling schedule that indicates specific times and/or dates at which the network-based trend service should capture samples. Network-based trend service 100 may store the data samples in trend data 160 for subsequent trend processing.

In various embodiments, network-based trend service 100 may determine a measure of the occurrences of the search target. One such measure may include a combined count. The combined count may be derived from the number of search results as well as the instance counts associated with the search results. For example, in some embodiments, the combined count may be a count that is proportional to the sum of a weighted amount of search results and a weighted amount of instance counts. For instance, a weighted count may be the sum of the number of search results weighted by two-thirds and the number of instance counts weighted by one-third. One skilled in the art will recognize that there are various combinations in which the number of search results and the instance counts associated with each search result may be combined to create a combined account. In various embodiments, the combination of the number of search results and the associated instance counts to form a combined count may be user-configurable. For example, the user may specify weights given to each within the trend profile information.

Network-based trend service 100 may provide one or more notifications, such as notification(s) 130, to user 110. In many cases, network-based trend service 100 may send a notification 130 to user 110 in response to detecting that a threshold of a trend profile 105 is met. For example, in some cases, a trend profile may include an "initial threshold" such that the network-based trend service may not capture data samples until the initial threshold is met. For instance, the initial threshold may be "1,000 search results." Accordingly, the network-based trend service may refrain from capturing data samples until at least 1,000 search results are detected among the network locations accessible through network 150. After a particular threshold is met, the network-based trend service may provide an associated notification to the user. The various thresholds of trend profile may be user-configurable. In various embodiments, network-based trend service 100 may be configured to provide a notification to a user in response to detecting that a trend threshold has been detected. The trend threshold may be included in the trend profile information and may indicate a particular trend, such as ascending or descending trends, among the data samples.

Network-based trend service 100 may detect one or more trends among the captured data samples, such as ascending trends (indicating a rise in the number of search results over time), descending trends (indicating a decline in the number of search results over time), lateral trends (indicating little to no change in the number of search results over time), and/or oscillating trends (indicating large fluctuations yet little average change over time). The various trends that are detected may provide insight into the network-based activity associated with a particular search target. For example, an ascending trend may indicate that network-based activity for the respective search target is rising. For instance, an ascending trend or "spike" in activity might be observed for a search target (e.g., "product XYZ" or "company ABC") recently featured in a television program or news article. The various trends detected may be aggregated into one or more trend reports as illustrated by trend report(s) 140.

In various embodiments, data may be evaluated relative to the first data sample captured. For example, if the first data sample indicates 10,000 search results for a particular search topic and the $100^{th}$ data sample indicates 20,000 search results for the search topic, the $100^{th}$ data sample indicates a 100% increase in search results. Similar principles may apply to the instance count and combined count described above. Additionally, in some embodiments, the network-based trend service may enable the user to specify a configurable baseline for the evaluation of data samples. For instance, consider the example above with another data sample: the $50^{th}$ data sample which indicates 5,000 search results. For various reasons, such as to avoid noisy or unreliable data, the user may alter the baseline by selecting another data point. In this example, if the user selects the $50^{th}$ data sample as the baseline, the $100^{th}$ data sample would indicate an increase of 400% relative to the baseline. While the configurable baseline may be specified in the trend profile information, the user may also change the baseline throughout operation of the network-based trend service.

Figure 2A:
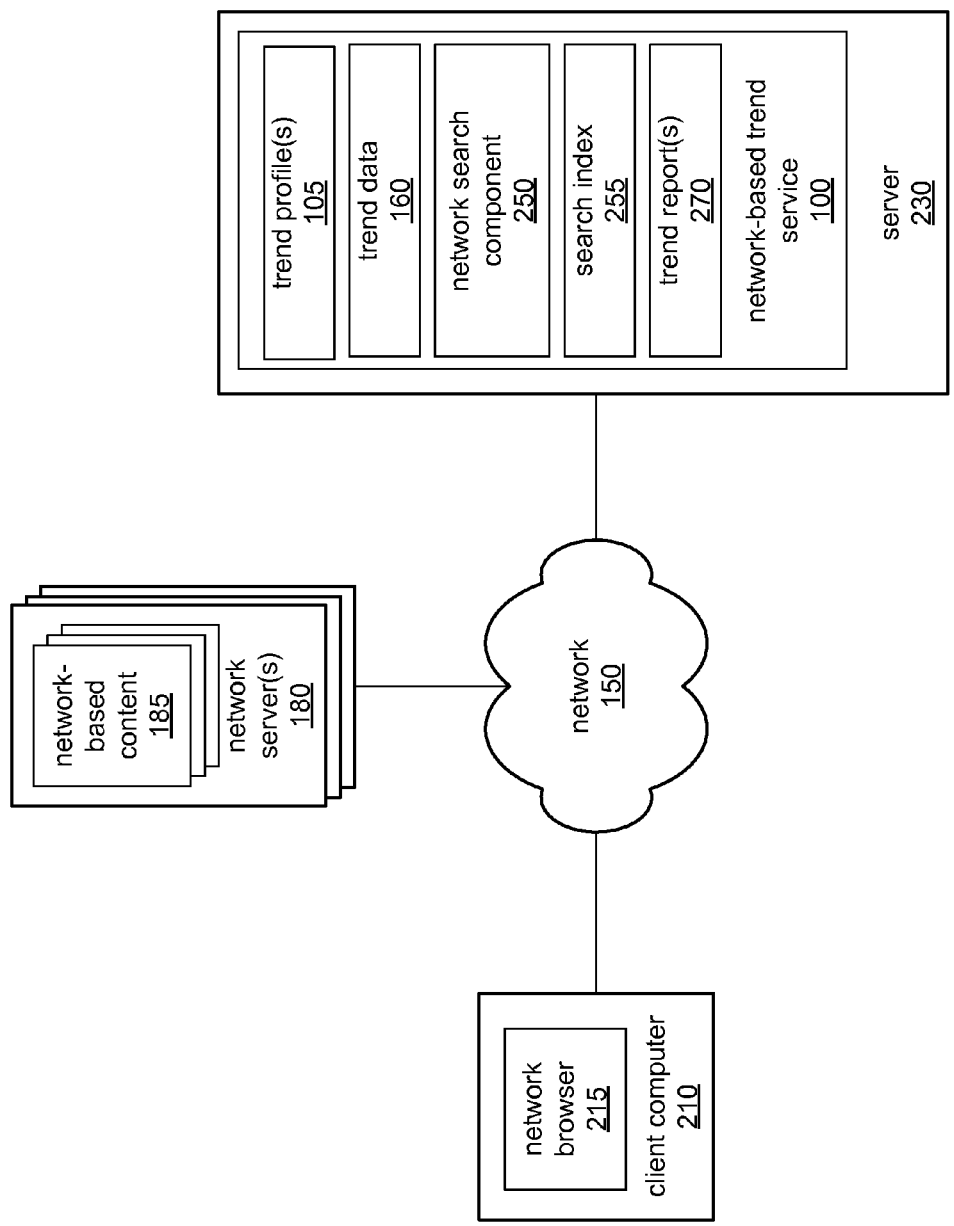
FIG. 2a is a block diagram illustrating one embodiment of a system for detecting network-based trends.

FIG. 2 is a block diagram illustrating a network-based trend service according to one embodiment. In this embodiment, network-based trend service 100 may run on a server such as server 230. Server 230 may be any of various computer systems coupled to a network (e.g., the Internet, a LAN or WAN) including, but not limited to, a web server, an application server, a database server, or a combination thereof. Network-based trend service 100 may be implemented as a software application, hardware, or a combination thereof. In some embodiments, network-based trend service 100 may be distributed across multiple servers or computer systems, such as computer systems coupled via a network such as a LAN, WAN (e.g., the Internet), or a combination thereof.

Network-based trend service 100 may be configured to receive trend profile information, such as the trend profile information described above in regard to FIG. 1 (e.g., search target, sampling frequency, sampling schedule, thresholds, search domain). In many embodiments, network-based trend service 100 may receive trend profile information 120 from a computer system, such as client computer 210. In various embodiments, a user may use client computer 210 equipped with network browser 215 to submit trend profile information to network-based trend service 100 over network 150. Client computer 210 may be any of various computer systems such as a desktop computer, laptop computer, or another device capable of running a network browser, such as network browser 215. In various embodiments, network browser 215 may represent any of various web-browsing applications, such as Microsoft Internet Explorer™, Netscape Navigator™, Mozilla Firefox™, or any application that is capable of accessing and displaying documents or web pages, such as according to the Hypertext Transport Protocol (HTTP). In one embodiment, network-based trend service 100 may host a network resource, web page, web service, and/or an online account service such that a user may access the network-based trend service 100 with network browser 215 to submit trend profile information. For example, network-based trend service 100 may provide an online account service that a user may log on to through network browser 215 to submit trend profile information such as search targets, sampling frequencies, sampling schedules, as well as various thresholds.

Network-based trend service 100 may include a network search component, such as network search component 250, configured to access network-based content located at various network locations, such as network-based content 185. In many cases, network search component 250 may browse network 150 by accessing various network-based content located at various network locations, such as network-based content 185, in an automated, methodical manner. For example, in one embodiment, network search component 250 may navigate to one or more "seed" network locations (e.g., from user-supplied URLs or predefined URLs) and navigate to subsequent network locations by accessing and navigating to pathnames, URLs and/or hyperlinks present in each seed network location (e.g., in a web page, network resource or other network-based content). The network search component may also navigate to network locations from the newly accessed web pages, such as pathnames, URLs and/or hyperlinks. In other words, network search component 250 may search network 150 by navigating from network location to network location through a series of pathnames, URLs or hyperlinks detected from each network location. Other methods of accessing network-based content at various network locations (e.g., navigating through a list or database of network locations, URLs or hyperlinks) may also be employed by network search component 250. For example, in some embodiments, network search component 250 may generate a "search frontier" or a list of network locations to be visited by searching network 150 and detecting the various network locations (e.g., indicated by pathnames, URLs and/or hyperlinks) that are indicated by the network-based content. As new network locations are detected, they may be added to the search frontier. Due to the dynamic nature of many networks (e.g., web pages of the Internet may be updated, added, or removed at any time), the network search component may maintain an accurate search frontier by continually searching network 150 and adding or removing network locations from the search frontier as necessary. Additionally, maintaining a search frontier may prevent network search component 250 from redundantly navigating to network locations. While other methods of network searching will be apparent to one skilled in the art, in general, network search component 250 may use any method of accessing network-based content of one or more network locations over network 150.

In various embodiments, network search component 250 may search network 150 to create and/or maintain a search index, such as search index 255. Search index 255 may have the functionality of an index typically employed by Internet search engines to locate web pages containing specific keywords. To populate the index, network search component 250 may search network 150 to access network-based content at various network locations. For each network location, network search component 250 may parse the respective network-based content to determine the individual keywords within the network-based content of the network location. The individual keywords and the respective network location (e.g., pathname or URL) of the network location in which the keywords are found may be added to the search index. The network search component may create and/or maintain the search index such that the search index may return a list of network locations that contain a specific search target (e.g., one or more keywords) in response to a query or request including the specific search target. For example, if the search index is queried with the search target "product ABC," the search index may return a list of network locations that contain network-based content including the search target "product ABC."

Network-based trend service 100 may be configured to capture data samples for each trend profile 105. As described above, each trend profile 105 may specify, among other things, a search target, a sampling frequency or schedule, and one or more thresholds. A data sample may include, among other things, a number of search results (e.g., a number of web pages that contain the search target) and an instance count for each search result (e.g., how many instances of the search result are present within the search result). A data sample may also include other values such as the total instance count (e.g., the sum of the individual instance counts for all search results), the URLs associated with each search result, and/or the time at which the data sample was captured.

Network-based trend service 100 may capture data samples for each trend profile 105 at regular intervals. For example, the network-based trend service may capture data samples according to the sampling frequency included in the respective trend profile. For instance, if the sampling frequency of a trend profile is "once per week," the web trend service 100 may capture data samples once per week for that trend profile. One skilled in the art will recognize that the sampling frequency may include any number of additional parameters, such as specific times (e.g., "once per day at 5:00 P.M."), specific days (e.g., "once per week, on Thursday"), or combination thereof (e.g., "once per week, every Thursday at 5:00 P.M."). Additionally, network-based trend service 100 may capture data samples for each trend profile according to a schedule, such as a schedule submitted by a user as trend profile information. In some embodiments, network-based trend service 100 may provide an interface for a user to create a schedule (e.g., a web interface, such as a web page or web application).

For each trend profile 105, network-based trend service 100 may capture data samples by accessing network-based trend content of various network locations, such as network-based trend content 185, through network 150. In various embodiments, network-based trend service 100 may compare the network-content (e.g., web pages, web documents, text, images, audio, video, multimedia, files, tags, metadata and other network content) at each network location to the search target of the trend profile in order to determine if any of the network content matches the search target. Network-based trend service 100 may search for the search target among each of the network locations of the search domain as specified by the trend profile (e.g., all accessible network locations, network locations of a specific domain or sub-domain, or a specific list of network locations) for search results and record respective instance counts and network locations. For each search result (e.g., each network location containing at least one instance of the search target), network-based trend service 100 may record the instance count and the network location of the search result. The respective instance counts and network locations of the one or more search results may be aggregated into a data sample. The data sample may contain other data such as the total number of search result network locations (e.g., the total number of network locations having at least one instance of the search target), a total instance count (e.g., the sum of each individual instance count), and/or a variation thereof, such as average instance count per search result.

In some in embodiments, network-based trend service 100 may capture data samples by querying a search index, such as search index 255, and store them in trend data 160. As described above, in response to a query including a particular search target, search index 255 may return a list of network locations of the corresponding search results, such as web pages that contain the particular search target. Search index 255 may also return the instance count for each network location. To capture a data sample, network-based trend service 100 may query search index 255, receive the results from the search index (e.g., list of search result network location, instance counts for each network location, total number of search results, total instance count), and record the results in the data sample.

In various embodiments, network-based trend service 100 may be configured to perform tone-based searching as described in applicant's co-pending application entitled "Method and Apparatus for Performing a Tone-Based Search" having application Ser. No. 11/489,315, and which is hereby incorporated by reference in its entirety. In one embodiment, network search component 250 may be configured to perform tone based searching. Network-based trend service 100 may be configured to perform tone-based searching to collect data tone-based data samples. For example, in one embodiment, in addition to detecting search results and associated instance counts, network-based trend service 100 may detect the tone of each search result. For instance, each search result may be associated with a positive tone, negative tone, or neutral tone dependent upon the search results proximity to particular context-terms within the network content at various network locations. The network-based trend service 100 may determine an overall tone for a particular data sample. For example, for a particular data sample, network-based trend service 100 may aggregate the individual tones of each search result to determine an overall tone (e.g., the most common tone among the search results) for the data sample.

Each data sample captured by network-based trend service 100 may reflect information about network-based content accessible through network 150 at a given time (or a given range of time, since capturing a data sample may not occur instantaneously). Thus, capturing multiple data samples over a period of time, such as according to the sampling frequency or sampling schedule of a trend profile 105, may provide insight into one or more trends of network 150 (e.g., the Internet and/or World Wide Web). The network-based trend service may store various data samples as illustrated by trend data 160. In various embodiments the data samples may be organized within trend data 160 into one or more data sample sets each corresponding to a particular trend profile. In other words, for each trend profile, trend data 160 may include a data sample set that include data samples captured by the network-based trend service.

Network-based trend service 100 may be configured to detect one or more trends among each data sample set, such as ascending trends, descending trends, lateral trends, and/or oscillating trends as described above. Network-based trend service 100 may be configured to create one or more trend reports, such as trend report(s) 270, that document one or more trends associated with a particular data sample set. Accordingly, each trend report may correspond to a particular trend profile. A trend report may contain one or more trends detected among a particular data sample set. In various embodiments, a trend report may include one or more text descriptions (e.g., descriptions of trends), graphs (e.g., plots of data samples illustrating one or more trends), images and/or other types of media (e.g., video, graphics, animations) to illustrate one or more trends among the particular data set. A trend report may adhere to any of various electronic formats such as portable document format, Microsoft Word™ document format, Microsoft Excel™ document format and/or other electronic formats. One example of a trend report is illustrated in trend report display 500 described below in regard to FIG. 5.

In various embodiments, network-based trend service 100 may be configured to enable a user to publish a trend report, such as publishing a trend report on network 150 (e.g., a LAN, WAN, or the Internet). For example, trend reports may be published as web pages or other network documents accessible to other users over a network, such as the Internet. In this way, the network-based trend service may enable a user to share trend reports with other individuals, such as friends or colleagues. For example, a business owner may use network-based trend service 100 to publish a trend report about a small business and share the trend report with employees of the business by providing them with a URL to web page on which the trend report is published. In one embodiment, network-based trend service 100 may enable a user to publish a trend report to web log (or "blog"), such as an online journal or diary. In various embodiments, network-based trend service 100 may update published trend reports with the most recent trend data. For example, as additional data samples for a particular trend report are captured, network-based trend service 100 may automatically update items of the trend report that really on the data sample set to which the data sample belongs (e.g., graphs, plots, data tables, statistics).

In some embodiments, a particular trend report 270 may be re-created by a user who has access to the corresponding trend profile and/or the corresponding trend profile information. Accordingly, network-based trend service 100 may provide a framework for a user to transmit a trend profile (or the corresponding trend profile information) to other user who may use the trend information to create a corresponding trend profile. In some cases, network-based trend service 100 may provide a framework for users to buy, sell, or trade trend profiles (or the corresponding trend profile information) to other users or organizations (e.g., businesses). For example, a user may use network-based trend service 100 to create a "marketing study" trend profile that corresponds to a particular product or type of product. An organization (e.g., a business interested in selling the particular product or type of product) may purchase the marketing study trend profile from the user through the network-based trend service.

Figure 2B:
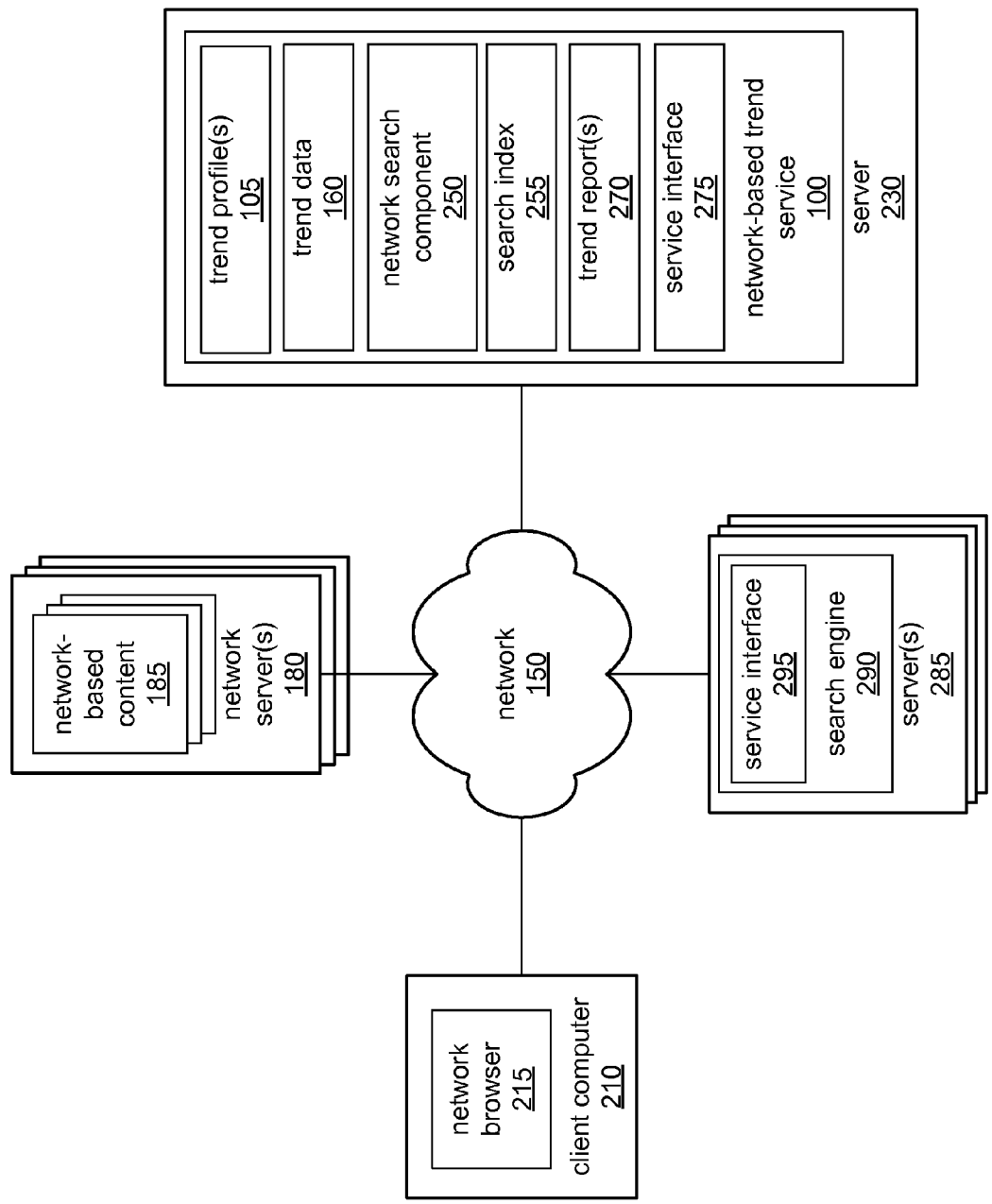
FIG. 2b is a block diagram illustrating one embodiment of a system for detecting network-based trends.

In various embodiments, network-based trend service 100 may capture data samples by utilizing other services, such as services provided by Internet search engines and other network search engines. The block diagram of FIG. 2b illustrates a network-based trend service configured to capture data samples by utilizing one or more search engines (e.g., Internet search engines), according to one embodiment. As illustrated in FIG. 2b, one or more search servers, such as servers 285, may implement one or more search engines, such as search engine 290. Search engines are well known in the art and may be configured to provide, in response to a search target query (e.g., one or more keywords), a list of search results (e.g., web pages and corresponding URLs) that include the particular search target. One or more search engines, such as search engine 290, may include a service interface (e.g., a web service interface or other type of interface accessible to other systems and/or applications), such as service interface 295. Interface 295 may be configured to receive requests, such as search queries including search targets, and provide a list of search results and other corresponding information, such as URLs of the search results, instance counts for each URL, total instance count, and/or total number of search results. In some embodiments, to capture data samples for a particular search target, network-based trend service 100 may send a request through a service interface, such as service interface 275, to service interface 295 for search results and additional information (e.g., instance counts for each URL, total instance count, and/or total number of search results) for a particular search target. In response, network-based trend service 100 may receive the search results and the additional information from service interface 295. The search results and additional information may be aggregated into a data sample and stored in the appropriate portion of trend data 160.

Figure 3:
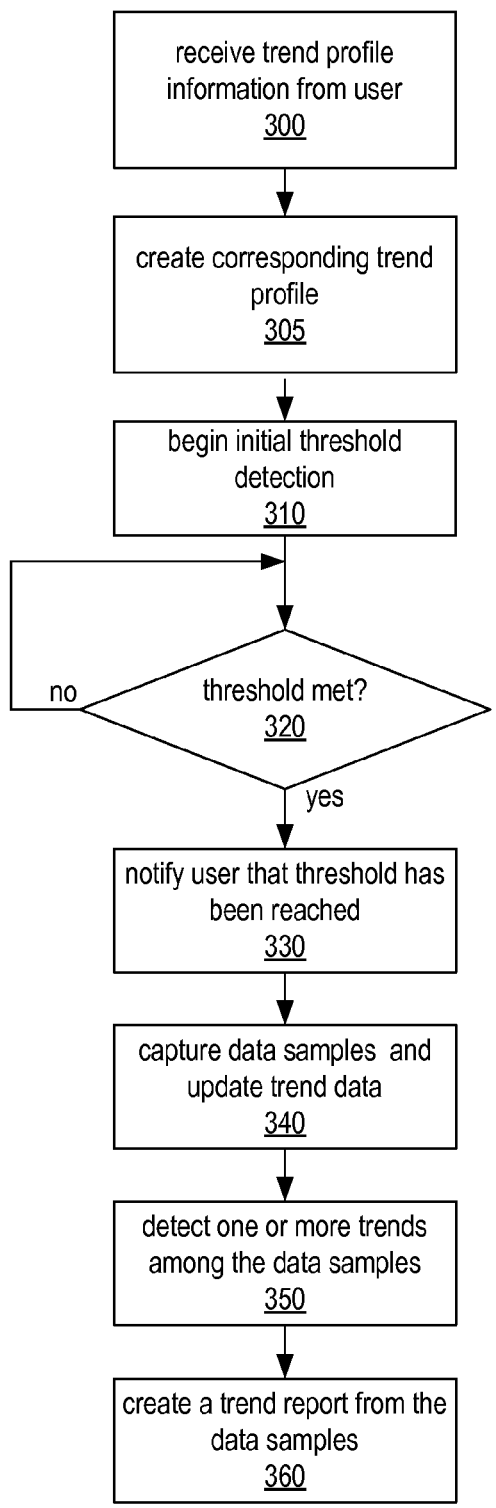
FIG. 3 is a flowchart illustrating one embodiment of a method for detecting network-based trends.

An exemplary method including creating a trend profile and capturing corresponding data samples is illustrated by the flowchart of FIG. 3. In various embodiments, network-based trend service 100 may be configured to implement the method described herein. As illustrated by block 300, the method may include receiving trend profile information from a user. In various embodiments, receiving trend profile information may include receiving information pertaining to, but not limited to, one or more search targets, sampling frequencies, sampling schedules, thresholds, and/or a search domain. For example, network-based trend service 100 may receive the following information from a user: "product XYZ" (the search target), "four times per day" (the sampling frequency), "begin once 1,000 search results have been detected" (the initial threshold), and/or "all accessible network locations" (the search domain). Receiving trend profile information from a user may include receiving information through a network user interface, such as one or more web pages of an online account service. For example, network-based trend service 100 may receive trend profile information from a user through an online account service provided by the network-based trend service.

Additionally, as illustrated by block 305, the method may include creating a trend profile. Creating a trend profile may involve parsing, interpreting, and/or storing the trend profile information from the user such that the trend profile may be interpreted by a network-based trend service, such as network-based trend service 100. In many cases, each trend profile may include, among other things, a search target, one or more sampling frequencies or sampling schedules, thresholds, and/or a search domain.

As illustrated by block 310, the method may include beginning initial threshold detection. In some cases, the trend profile information received from the user (and the corresponding trend profile) may include an initial threshold for the capturing of data samples. For example, the initial threshold may be "1,000 search results," in which case the method would include repeatedly checking the network locations of the specified search domain until 1,000 distinct search results are detected. For instance, network-based trend service 100 may access network-based content, such as network-based content 185, and begin evaluating each location to determine if the initial threshold has been met. As illustrated by the negative output of block 320, the method may wait to proceed until the threshold has been met. If the threshold has been met, the method may proceed as illustrated by the positive output of block 320.

As illustrated by block 330, the method may include notifying the user that the threshold has been reached. Notifying the user that the threshold has been reached may include sending an electronic message to the user (e.g., an electronic mail message, instant message, and/or voice message). For instance, network-based trend service 100 may provide an email to the user that explains "the initial threshold for your trend profile XYZ has been detected and data capture will begin shortly." In some embodiments, there may be a deliberate delay between the time that the notification is sent to the user and the time when the capturing of data samples begins, so the user may have adequate time to make any desired adjustments to the trend profile. In some cases, notifying the user that the threshold has been reached may include "posting" a message to an online account service associated with the user, such as the online account service for submitting trend profile information described above in regard to network-based trend service 100.

The method may include capturing data samples and updating trend data as illustrated by block 340. For a particular trend profile, capturing data samples may include accessing network-based content of one or more network locations, such as network-based content 185, through a network, such as network 150. In various embodiments, capturing the data samples may include comparing the network-based content (e.g., web pages, web documents, text, images, audio, video, multimedia, files, tags, metadata and other network content) at each network location to the search target of the trend profile in order to determine if any of the network-based content matches the search target. Capturing data samples may include searching for the search target among each of the network locations of the search domain as specified by the trend profile (e.g., all accessible network locations, network locations of a specific domain or sub-domain, or a specific list of network locations) for search results and record respective instance counts and network locations. For each search result (e.g., each network location containing at least one instance of the search target), capturing data samples may include recording the instance count and the network location of the search result. Additionally, capturing a data sample may include capturing the respective instance counts and network locations of the one or more search results in a data sample. Capturing a data sample may also include capturing other data in the data sample, such as the total number of search result network locations (e.g., the total number of network locations having at least one instance of the search target), a total instance count (e.g., the sum of each individual instance count), and/or a variation thereof, such as an average instance count per search result.

In some embodiments, capturing data samples may include querying a search index, such as search index 255. As described above, in response to a query including a particular search target, search index 255 may return a list of network locations of the corresponding search results (e.g., URLs of web pages that contain the particular search target). Search index 255 may also return an instance count for each network location. Accordingly, capturing a data sample may include querying a search index, such as search index 255, receiving the results from the search index (e.g., list of search result network locations, instance counts for each network location, total number of search results, total instance count), and recording the results in a data sample.

In various embodiments, capturing data samples may include utilizing other services, such as services provided by Internet search engines and/or search engine 290 described above. For instance, a search engine may be configured to provide, in response to a search target query (e.g., one or more keywords), a list of search results (e.g., web pages and corresponding URLs) that include the particular search target. One or more search engines may include a service interface (e.g., a web service interface or other type of interface accessible to other systems and/or applications), such as service interface 295 described above. A search engine service interface may be configured to receive requests, such as search queries including search targets, and to provide a list of search results and other corresponding information such as URLs of the search results, instance counts for each URL, total instance count, and/or total number of search results. Accordingly, capturing data samples for a particular search target may include sending a request to a search engine service interface, such as service interface 295 described above, for search results and additional information (e.g., instance counts for each URL, total instance count, and/or total number of search results) for a particular search target. Furthermore, capturing a data sample may include receiving the search results and the additional information from the service interface as well as aggregating the search results and additional information into a data sample.

For a particular trend profile, the capturing of data samples may be an ongoing process that adheres to the sampling frequency and/or the sampling schedule of the trend profile. In some embodiments, the trend profile may also specify an "end" or "quit" time at which the capturing of data samples may cease. In some cases, the trend profile may specify a maximum number of data samples to be captured (e.g., 30,000 samples) and/or a "quit" threshold (e.g., "quit sample capture when the number of search results has decreased by 50% or more). In other cases, a user may provide an indication of when to stop capturing data samples. As each data sample is captured, trend data, such as trend data 160 described above, may be updated accordingly. In various embodiments, trend data may be organized or partitioned into distinct sections each corresponding to a particular profile.

As illustrated by block 350, the method may include detecting one or more trends among the data samples, such as the trends described above in regard to FIG. 1 and FIG. 2. As illustrated by block 360, the method may include creating a trend report from the data samples. A trend report may contain one or more trends detected among a particular data sample set. In various embodiments, a trend report may include one or more text descriptions (e.g., descriptions of trends), graphs (e.g., plots of data samples illustrating one or more trends), images and/or other types of media (e.g., video, graphics, animations) to illustrate one or more trends among the particular data set. A trend report may adhere to any of various electronic formats such as portable document format, Microsoft Word™ document format, Microsoft Excel™ document format and/or other electronic formats. One example of a trend report is illustrated in trend report display 500 described below in regard to FIG. 5.

Figure 4:
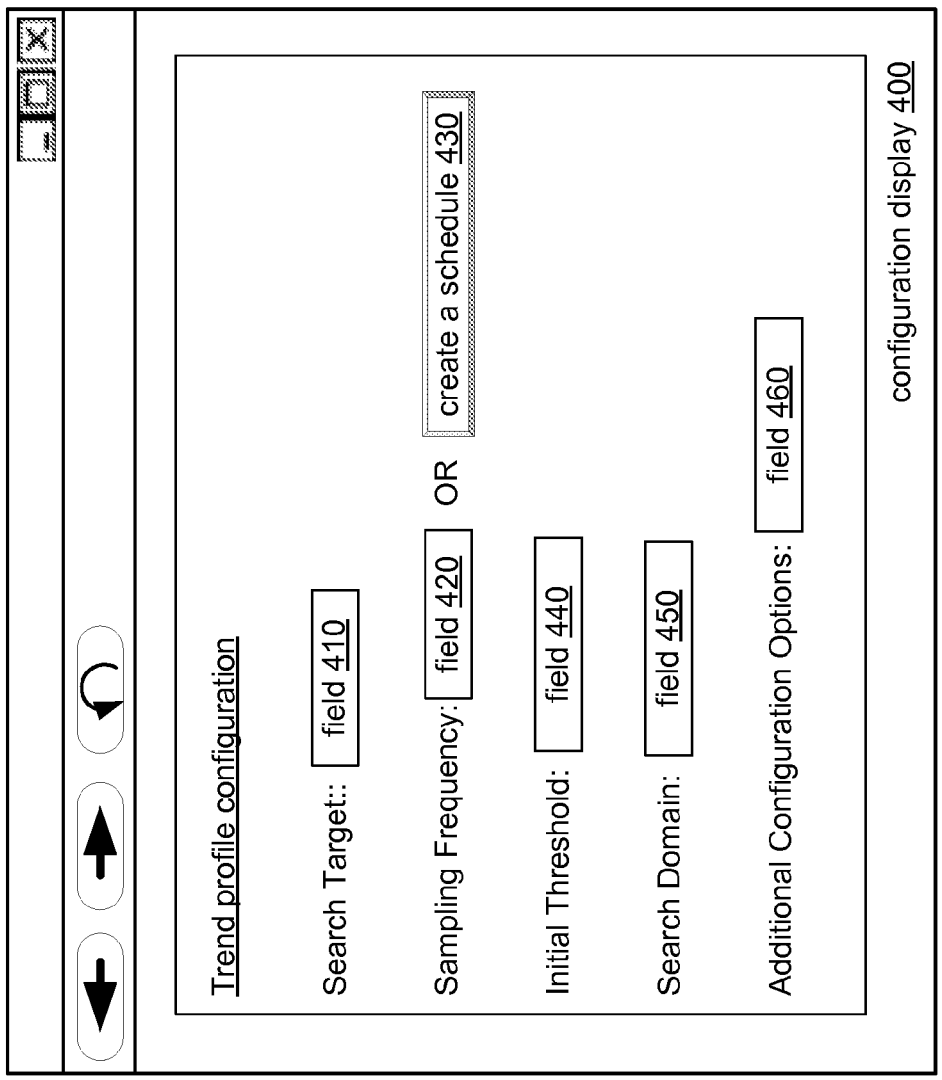
FIG. 4 is an exemplary configuration display according to one embodiment.

In various embodiments, a network-based trend service, such as network-based trend service 100, may utilize one or more configuration displays to receive trend profile configuration information. An exemplary configuration display is illustrated in FIG. 4. Configuration display 400 may include a "search target" field, such as field 410, that may enable a user to submit trend profile information. In various embodiments, a configuration display may include a search target field, such as field 410, that may enable a user to submit a particular search target. For example, a user may enter "Product XYZ" or "Company ABC" into search field 410. Configuration display 400 may also include a sampling frequency field, such as field 420, that may enable a user to submit a sampling frequency, such as the sampling frequencies described above. For example, a user may submit a sampling frequency of "once per day", "twice per week" or any other frequency. Alternatively, configuration display 400 may enable a user to submit a sampling schedule by selecting button 430. For example, when a user selects button 430, the user may be presented with a calendar display in which a schedule may be entered. Configuration display 400 may also include an initial threshold field such as field 440 which may enable a user to submit a threshold for data sample capture. For example, a user may submit a threshold of "1,000 search results" such that the network-based trend service 100 may not begin capturing data samples until the respective search target is detected among 1,000 network locations. Configuration display 400 may also include a search domain field, such as search domain 450, that may enable a user to submit a specific domain (e.g., a portion of a network) in which to capture data samples. For example, a user may enter various search domain options, such as "all accessible network locations", a specific network location(s), or a particular network subdomain (e.g., when searching a LAN).

In various embodiments, configuration display 400 may include one or more additional fields for submitting configuration information, such as field 460. For example, field 460 may enable a user to submit various configuration options, such as notification options (e.g., the user may be notified when various trends are detected or when new data samples have been captured), trend report options (e.g., a selection of which trend profiles should have corresponding trend reports), publishing options (e.g., if and/or where a particular trend report should be published), and/or commerce options (e.g., configuration information for the buying, selling, or trading of trend reports).

In various embodiments, fields 410-460 may include various graphical user interface (GUI) components, such as text entry fields, text menus, drop-down menus, buttons, controls, and/or any other component for submitting information through a display. In general, configuration display 408 may utilize any method or component configured to enable a user to submit information, such as through a computer keyboard and/or pointing device.

Figure 5:
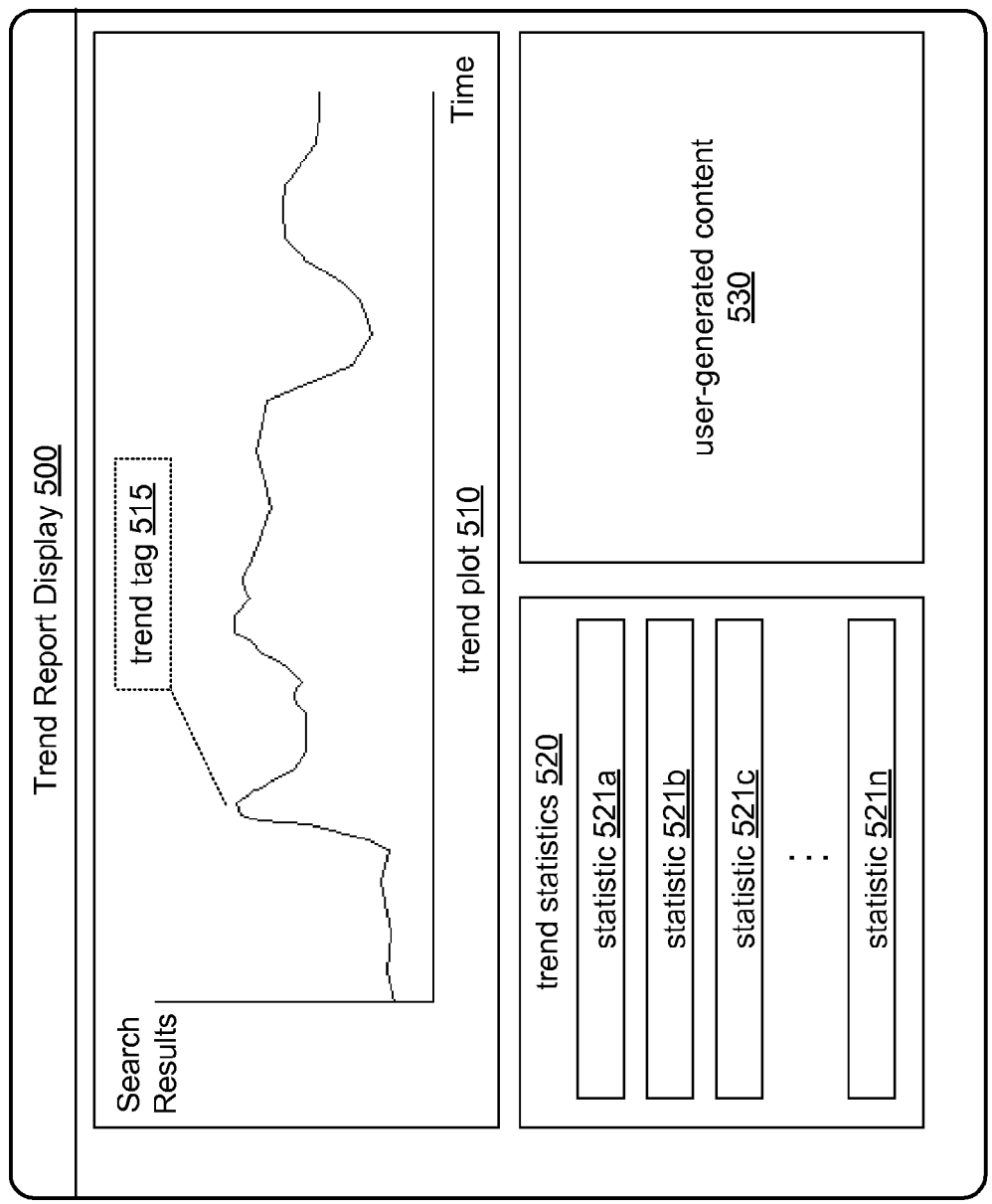
FIG. 5 is an exemplary trend report display according to one embodiment.

As described above, network-based trend service may 100 be configured to create one or more trend reports. An exemplary trend report display is illustrated by FIG. 5. Trend report display 500 may include one or more plots such as trend plot 510. In this example, trend plot 510 may illustrate a plot of the number of search results (e.g., the number of network locations including at least one instance of the search target) over time. In some embodiments, trend plot 510 may include one or more tags, such as trend tag 515, that identify one or more trends of the trend plot. For instance, trend tag 515 may indicate an ascending trend or "spike" in the number of search results. Trend report display 500 may also include a trend statistics field, such as trend statistics field 520. Trend statistics field 520 may include one or more statistics, such as statistics 521*a*-521*n*. Each statistic may represent one or more characteristics about the trend data (e.g., captured data samples) associated with a particular trend profile. For example, statistics may include one or more of: a minimum number of search results for a given data sample, a maximum number of search results for a given data sample, a number of trends detected among the trend data, a percentage increase and/or decrease over a given time period, an absolute increase and/or decrease (e.g., in terms of search results) over a given time period, average instance count per data sample, average instance count increase and/or decrease over a given time period, and/or any other statistic about trend data associated with a particular trend profile. In various embodiments, the type of statistics included in trend statistics 520 may be specified by the user (e.g., in the trend profile information) or automatically chosen by network-based trend mechanism 100.

In various embodiments, the trend report display may enable the user to gather additional detailed information about the trend data. For example, the user may select one or more data points of trend plot 510 to view statistics pertaining to the respective data points. In some cases, the trend plot may enable a user to view the specific network locations associated with each data point as well as instance counts for each search result. In some cases, the user may apply additional filters to the data, such as the filters described above in regard to FIG. 1. For example, the trend plot may enable a user to discard various data points dependent upon user-specified criteria (e.g., a specific number of search results or an instance count).

In various embodiments, trend report display 500 may include a user-generated content field, such as user-generated content field 530. User-generated content field 530 may contain information submitted or created by a user. For example, if a user publishes trend report display 500 on a network (e.g., through a web log or "blog" on the Internet or other network), the user-generated content may include a welcome greeting, an explanation of the particular trend report, or other information pertaining to the trend report. As described above, a user may buy, sell, or trade trend reports and/or corresponding trend profiles. Accordingly, user-generated content may include pricing information for the particular trend report and/or corresponding trend profile. In general, a user may include any information within user-generated content 530.

Exemplary System

Various embodiments of a system and method for detecting trends in network-based content, as described herein, may be executed on one or more computer systems, which may interact with various other devices. One such computer system is computer system 600 illustrated by FIG. 6. Computer system 600 may be capable of implementing a network-based trend service as illustrated by network-based trend service 625. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a network-based trend service, such as network-based trend service 100 described above, are shown stored within system memory 620 as network-based trend service 625 and trend data 635, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 150), such as other computer systems (e.g., network servers 180), or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
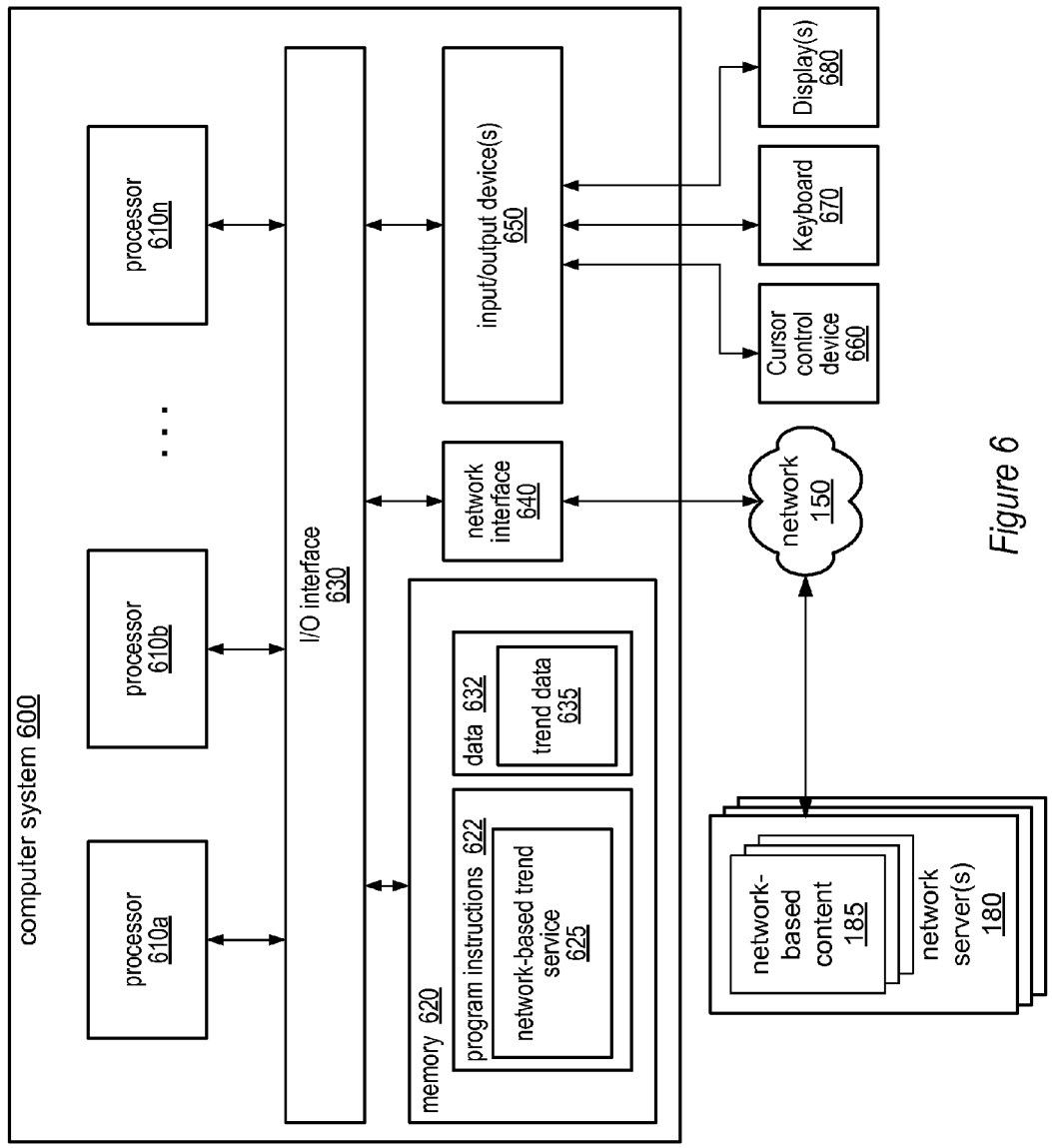
FIG. 6 illustrates a computing system suitable for implementing a network-based trend service, according to one embodiment.

As shown in FIG. 6, memory 620 may include program instructions 622 configured to implement a network-based trend service, such as network-based trend service 100, and trend data 635, comprising various data (e.g., data samples and trend data as describe above) accessible by network-based trend service 625. In one embodiment, service 625 may include one or more elements illustrated in FIGS. 1, 2a, 2b, and 6. In one embodiment, service 625 may be configured to implement the method described in FIG. 3. In other embodiments, different elements and data may be included.

Those skilled in the art will appreciate that computer system 600 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
   a processor; and
   a memory coupled to the processor, wherein the memory comprises program instructions executable by the processor to:
   receive configuration information from a user comprising a search target specifying one or more keywords, one or more sampling frequencies or sampling schedules, and a search domain, the search domain including an indicator to search one of the following: all accessible network locations, network locations of a specific domain or sub-domain, or a specific list of network locations;
   capture a plurality of data samples, the data samples being taken at different times over a defined period of time, wherein capturing each data sample comprises:
   searching a network of multiple network locations to determine the total number of network locations that include at least one instance of the search target, and also to determine the number of instances the search result is present at each of the network locations; and
   analyzing the plurality of data samples to identify one or more trends in the number of network locations that include at least one instance of the search target.

2. The system of claim 1, wherein the program instructions are further executable to capture each of the plurality of data samples according to a schedule.

3. The system of claim 2, wherein the schedule is specified by the configuration information received from the user.

4. The system of claim 1, wherein the configuration information comprises a threshold indicating a particular measure of the occurrences of the search target, wherein said program instructions are further executable to notify the user that the threshold has been reached in response to detecting a measure of the occurrences of the search target that exceeds said particular measure.

5. The system of claim 1, wherein the configuration information comprises a threshold indicating a particular measure of the occurrences of the search target, wherein said program instructions are further executable to notify the user that the threshold has been reached in response to detecting a measure of the occurrences of the search target that is less than said particular measure.

6. The system of claim 1, wherein said measure of the occurrences of the search target within each data sample is based on a quantity of said one or more search results.

7. The system of claim 1, wherein said measure of the occurrences of the search target within each data sample is based on a quantity of instances of the search target within network-based content indicated by said one or more search results.

8. The system of claim 1, wherein said measure of the occurrences of the search target within each data sample is based on a quantity of said one or more search results and a quantity of instances of the search target within network-based content indicated by said one or more search results.

9. The system of claim 1, wherein the program instructions are further executable to create a trend report indicating at least one of said one or more trends.

10. The system of claim 9, wherein the program instructions are further executable to publish said trend report on a web page accessible through the Internet.

11. The system of claim 9, wherein the program instructions are further executable to provide a framework for sharing or exchanging said trend report with other users through the Internet.

12. The system of claim 1, wherein the configuration information further comprises a search domain, wherein the search domain specifies said plurality of network locations.

13. The system of claim 1, wherein said program instructions are further executable to notify the user of at least one of said one or more trends.

14. A computer program product comprising:
a nontransitory computer-accessible medium;
and computer program code, encoded on the computer-accessible medium, comprising program instructions, which when executed by a processor, perform a process for:
receiving configuration information from a user comprising a search target specifying one or more keywords, one or more sampling frequencies or sampling schedules, and a search domain, the search domain including an indicator to search one of the following: all accessible network locations, network locations of a specific domain or sub-domain, or a specific list of network locations; and
capturing a plurality of data samples, the data samples being taken at different times over a defined period of time, wherein capturing each data sample comprises:
searching a network of multiple network locations to determine the total number of network locations that include at least one instance of the search target, and also to determine the number of instances the search result is present at each of the network locations; and
analyzing the plurality of data samples to identify one or more trends in the number of network locations that include at least one instance of the search target.

15. The computer program product of claim 14, wherein the program instructions are further executable to capture each of the plurality of data samples according to a schedule.

16. The computer program product of claim 14, wherein the schedule is specified by the configuration information received from the user.

17. The computer program product of claim 14, wherein the configuration information comprises a threshold indicating a particular measure of the occurrences of the search target, wherein said program instructions are further executable to notify the user that the threshold has been reached in response to detecting a measure of the occurrences of the search target that exceeds said particular measure.

18. The computer program product of claim 14, wherein the configuration information comprises a threshold indicating a particular measure of the occurrences of the search target, wherein said program instructions are further executable to notify the user that the threshold has been reached in response to detecting a measure of the occurrences of the search target that is less than said particular measure.

19. The computer program product of claim 14, wherein said measure of the occurrences of the search target within each data sample is based on a quantity of said one or more search results.

20. The computer program product of claim 14, wherein said measure of the occurrences of the search target within each data sample is based on a quantity of instances of the search target within network-based content indicated by said one or more search results.

21. The computer program product of claim 14, wherein said measure of the occurrences of the search target within each data sample is based on a quantity of said one or more search results and a quantity of instances of the search target within network-based content indicated by said one or more search results.

22. The computer program product of claim 14, wherein the program instructions are further executable to create a trend report indicating at least one of said one or more trends.

23. The computer program product of claim 22, wherein the program instructions are further executable to publish said trend report on a web page accessible through the Internet.

24. The computer program product of claim 22, wherein the program instructions are further executable to provide a framework for sharing or exchanging said trend report with other users through the Internet.

25. computer program product of claim 14, wherein the configuration information further comprises a search domain, wherein the search domain specifies said plurality of network locations.

26. The computer program product of claim 14, wherein said program instructions are further executable to notify the user of at least one of said one or more trends.

27. A system, comprising:
a processor; and
a memory coupled to the processor, wherein the memory comprises program instructions executable by the processor to:
receive a search target specifying one or more keywords;
perform a first search of a plurality of network locations to determine the total number of instances of the search target within the network content of the plurality of network locations, the network content including any web pages, web documents, text, images, audio, video, multimedia, files, tags, and metadata present at a given network location;
storing, if the total number of instances of the search target within the plurality of network locations exceeds a user-configurable predetermined threshold, a first data sample comprising the total number of instances of the search target within the plurality of network locations;

perform a second search at a predetermined time of the plurality of network locations to determine the total number of instances of the search target within the plurality of network locations;

storing, if the first data sample exists, and if the total number of instances of the search target within the plurality of network locations exceeds the user configurable predetermined threshold, a second data sample comprising the total number of instances of the search target within the plurality of network locations, if the total number of instances of the search target within the plurality of network locations found during the second search either exceeds the total number of instances of the search target in the first data sample by a predetermined threshold amount or is lower than the total number of instances of the search target in the first data sample by a predetermined threshold amount; and analyze the plurality of data samples to identify one or more trends in the number of network locations that include at least one instance of the search target.

28. A computer program product comprising:

a nontransitory computer-accessible medium;

and computer program code, encoded on the computer-accessible medium, comprising program instructions, which when executed by a processor, perform a process for:

receiving a search target specifying one or more keywords;

performing a first search of a plurality of network locations to determine the total number of instances of the search target within the network content of the plurality of network locations, the network content including any web pages, web documents, text, images, audio, video, multimedia, files, tags, and metadata present at a given network location;

storing, if the total number of instances of the search target within the plurality of network locations exceeds a user-configurable predetermined threshold, a first data sample comprising the total number of instances of the search target within the plurality of network locations;

performing a second search at a predetermined time of the plurality of network locations to determine the total number of instances of the search target within the plurality of network locations;

storing, if the first data sample exists, and if the total number of instances of the search target within the plurality of network locations exceeds the user configurable predetermined threshold, a second data sample comprising the total number of instances of the search target within the plurality of network locations, if the total number of instances of the search target within the plurality of network locations found during the second search either exceeds the total number of instances of the search target in the first data sample by a predetermined threshold amount or is lower than the total number of instances of the search target in the first data sample by a predetermined threshold amount; and analyzing the plurality of data samples to identify one or more trends in the number of network locations that include at least one instance of the search target.

* * * * *

UNITED STATES PATENT AND TRADEMARK OFFICE
CERTIFICATE OF CORRECTION

PATENT NO. : 7,895,227 B1
APPLICATION NO. : 11/741610
DATED : February 22, 2011
INVENTOR(S) : Kenneth Henderson Page 1 of 1

It is certified that error appears in the above-identified patent and that said Letters Patent is hereby corrected as shown below:

In Column 19, Line 65, Claim 16, replace "claim 14" with --claim 15--; and
In Column 20, Line 40, Claim 25, before "computer program" insert --The--.

Signed and Sealed this
Fifth Day of February, 2013

Teresa Stanek Rea
*Acting Director of the United States Patent and Trademark Office*